United States Patent [19]

Notaro et al.

[11] 3,714,277

[45] Jan. 30, 1973

[54] PROCESS FOR PREPARING CHLORINATED AROMATICS

[75] Inventors: Vincent A. Notaro; Charles M. Selwitz, Monroeville, Pa.

[73] Assignee: Gulf Research & Development Company, Pittsburgh, Pa.

[22] Filed: Sept. 28, 1970

[21] Appl. No.: 76,319

[52] U.S. Cl. ........260/650 R, 260/649 R, 260/649 F, 260/649 D, 260/650 F
[51] Int. Cl. ....................C07c 25/04, C07c 25/18
[58] Field of Search..................260/649 R, 649 F 260/649 DP, 650 R, 260/650 F

[56] References Cited

UNITED STATES PATENTS

| 3,591,644 | 7/1971 | Notaro et al. | 260/650 R |
|---|---|---|---|
| 3,160,653 | 12/1964 | Benning et al. | 260/650 R |
| 3,214,481 | 10/1965 | Heinemann et al. | 260/650 R X |
| 3,214,482 | 10/1965 | Caropreso et al. | 260/650 R X |
| 2,174,574 | 10/1939 | Fogler | 260/651 F |
| 3,509,204 | 4/1970 | Selwitz | 260/650 R |

Primary Examiner—Howard T. Mars
Attorney—Meyer Neishloss, Deane E. Keith and Joseph J. Carducci

[57] ABSTRACT

A process for preparing a chloro aromatic compound which involves heating an aromatic compound in the presence of a nitrate ion, a nitrite ion, NO or $NO_2$, HCl, water, oxygen, a strong acid and a 2,4,6-trialkylphenol.

7 Claims, No Drawings

PROCESS FOR PREPARING CHLORINATED AROMATICS

This application is directed to a process for adding a single chlorine to an aromatic compound.

In our application Ser. No. 839,042, filed July 3, 1969, and assigned to the same assignee as the present invention, now U.S. Pat. No. 3,363,170, we have shown that we can prepare a nuclear chloro or nuclear bromo aromatic compound by heating an aromatic compound in the presence of a nitrate ion, a nitrite ion, NO or $NO_2$, a chloride ion or a bromide ion, water, molecular oxygen and a strong acid. We have now found that when an aromatic is chlorinated with HCl in such system, the chlorination can be controlled, so that only one additional chlorine is added to said aromatic, by conducting the reaction in the additional presence of a 2,4,6-trialkylphenol.

The aromatic hydrocarbon reactant employed herein can be an aromatic hydrocarbon or a halogenated (chloro, bromo, fluoro, or iodo) aromatic hydrocarbon. Examples of such aromatic hydrocarbons that can be employed herein include benzene, toluene, ethylbenzene, cumene, naphthalene, anthracene, biphenyl, phenanthrene, t-butylbenzene, α-phenylnaphthalene, para-xylene, polystyrene, terphenyl, 3-phenylheptane, 1,4-diphenyl butane, diphenylmethane, tetralin, propylium anion, etc. Examples of such halogenated aromatic hydrocarbons that can be employed herein include chlorobenzene, ortho-bromotoluene, meta-iodobiphenyl, para-fluorobiphenyl, 2,3-dichloronaphthalene, ortho-chlorotoluene, meta-chlorotoluene, para-chlorotoluene, 1-phenyl-4-chloronaphthalene, 1-(3-fluorophenyl)-4-ethylnaphthalene, 2-iodophenanthrene, 6-chloronaphthacene, 4,10-dichlorochrysene, 1,5,6,10-tetrabromopyrene, 1-fluoro-4-chloro-5-bromo-7-iodotriphenylene, tri(2-chlorophenyl)methane, fluorobenzene, bromobenzene, iodobenzene, orthodichlorobenzene, meta-dichlorobenzene, para-dichlorobenzene, etc.

Also present in the reaction system is a substance selected from the group consisting of nitrate ions, nitrite ions, NO and $NO_2$. Thus, any compound falling within the above definition or which, for example, by ionization, oxidation or disproportionation, under the reaction conditions defined herein will result in the same can be employed. By "nitrate ions" we mean to include $NO_3^-$, a singly charged anion containing one nitrogen atom and three oxygen atoms. By "nitrite ions" we mean to include $NO_2^-$, a singly charged anion containing one nitrogen atom and two oxygen atoms. Examples of compounds that can be employed include nitric acid, sodium nitrate, cesium nitrate, sodium nitrite, potassium nitrite, nitric oxide, nitrous anhydride, nitrous acid, nitrogen dioxide, nitrogen tetroxide, nitric anhydride, nitrosyl chloride, nitrosyl bromide, nitroxyl chloride, etc.

Additionally present in the reaction system in HCl, water, molecular oxygen and a strong acid. By "strong acid," we mean to include protonic acids having ionization constants at 25° C. greater than about $10^{-2}$. Such acids include perchloric acid, toluene sulfonic acid, trifluoroacetic acid, sulfuric acid, iodic acid, etc. Acids that fall outside the above definition, for example, hydrofluoric acid, phosphoric acid, boric acid, mandelic acid, benzoic acid, etc., would not be suitable for use herein.

In accordance with the discovery described and claimed herein the reaction is carried out in the additional presence of a controlled amount of a 2,4,6-trialkylphenol in order to facilitate the addition of but one additional chlorine to the aromatic charge. In the 2,4,6-trialkylphenol used, the individual alkyl substituents can be the same of different and can have from one to 20 carbon atoms, preferably from one to four carbon atoms. Specific examples of 2,4,6-trialkylphenols that can be used include 2,4,6-trimethylphenol, 2,4,6-triethylphenol, 2,4,6-tri-n-propylphenol, 2,4,6-tri-isopropylphenol, 2,4,6-tri-n-butylphenol, 2,4,6-tri-tertiary-butylphenol, 2,4-dimethyl-6-ethylphenol, 2,6-dimethyl-4-ethylphenol, 2,4-dimethyl-6-tertiary-butylphenol, 2,4-ditertiary-butyl-6-methylphenol, 2,6-dimethyl-4-tertiary-butylphenol, 2,6-ditertiarybutyl-4-methylphenol, 2,4-dimethyl-6-n-hexylphenol, 2,6-dimethyl-4-n-eicosylphenol, etc.

The reaction defined herein is simply effected by bringing the materials together into contact with each other under specified conditions. The amount of HCl present in the reaction system relative to the aromatic hydrocarbon reactant, on a molar basis, can be from about 20:1 to about 1:20, preferably from about 6:1 to about 1:2. The amount of nitrate ion, nitrite ion, NO or $NO_2$ employed, on a molar basis, relative to the aromatic compound, can be from about 1:1 to about $1:10^6$, preferably from about 1:3 to about $1:10^6$. On a molar basis, relative to the aromatic compound, water can be present in the range of about 1,000:1 to about 0.1:1, preferably about 100:1 to about 2:1. The amount of molecular oxygen that can be employed relative to the aromatic compound reactant, on a molar basis, can be from about 1,000:1 to about 1:10, preferably from about 10:1 to about 1:1. The amount of strong acid employed relative to water, on a molar basis, can from about 2:1 to about 1:20, preferably from about 1:2 to about 1:8.

The amount of 2,4,6-trialkylphenol employed is critical and must be present, on a molar basis, relative to said nitrate ion, nitrite ion, NO or $NO_2$, in the range of about 1:100 to about 1:3, preferably in the range of about 1:20 to about 1:5. Below the defined amount, the trialkylphenol has no appreciable desired effect, whereas above the defined amount there is a tendency to inhibit the desired aromatic chlorination.

The temperature employed during the process can range from about 15 to about 200° C., preferably from about 60 to about 150° C., the pressure from about 0.1 to about 10,000 pounds per square inch gauge, preferably from about ten to about 1,000 pounds per square inch gauge, but most preferably from about 50 to about 150 pounds per square inch gauge, and the contact time from about 0.0001 to about 200, preferably from about one to about ten hours.

At the end of the reaction period, the desired chloro or bromo aromatic compound can be recovered from the reaction mixture in any suitable manner, for example, by phase separation and distillation at a temperature of about 50 to about 200° C. and a pressure of about 0.001 to about ten pounds per square inch gauge. Depending upon the boiling points of the products in the reaction mixture, the individual components thereof, including the desired chloro aromatic, will come off individually overhead and can thus be easily recovered.

The process of the invention can further be illustrated by the following.

A series of runs were made in which a mixture of reactants, as set forth below in TABLE I, was heated in an atmosphere of oxygen. Upon completion of the reaction in each run the organic and aqueous phases were separated from each other, and the organic phase was analyzed by gas liquid chromatography. The results obtained are set forth below in TABLE I.

TABLE I

| Run No. | 1 | 2 | 3 | 4 |
|---|---|---|---|---|
| reactants, millimols | | | | |
| Ortho Chlorotoluene | 150 | 150 | 150 | 150 |
| HCl | 300 | 300 | 300 | 300 |
| $HNO_3$ | 50 | 50 | 50 | 50 |
| $H_2O$ | 3927 | 3927 | 3927 | 3927 |
| $H_2SO_4$ | 592 | 592 | 592 | 592 |
| 2,6-di-t-butyl-p-cresol | 0 | 5 | 0 | 0 |
| 2,3,6-tri-t-butyl-phenol | 0 | 0 | 10 | 25 |
| Time, Hours | 6 | 6 | 6 | 3.5 |
| Temperature, °C. | 80 | 80 | 80 | 80 |
| pressure, pounds per Square Inch Gauge | 170 | 170 | 170 | 170 |
| *Millimols Oxygen Used | 87.1 | 80.9 | 93.4 | 0 |
| Percent Conversion of Ortho Chlorotoluene | 86.5 | 81.8 | 79.8 | 0 |
| Efficiency to Dichlorinated Product | 73.7 | 85.5 | 80.0 | 0 |
| Products, Mol Percent | | | | |
| Ortho Chlorotoluene | 13.5 | 15.9 | 20.0 | 0 |
| Dichlorotoluenes | 67.7 | 73.0 | 70.4 | 0 |
| Trichlorotoluenes | 16.1 | 10.5 | 9.0 | 0 |
| Other Unidentified Compounds | 2.7 | 0.6 | 0.6 | 0 |

* Determined by pressure drop in system.

The improvement obtained by operation in accordance with the procedure defined herein can be seen from an inspection of the data in TABLE I. Even though in Runs Nos. 2 and 3, wherein a 2,4,6-trialkyphenol was employed, a slightly lower conversion resulted over Run No. 1, wherein no 2,4,6-trialkylphenol was present there was obtained, however, a larger amount of dichlorotoluenes and decreased amounts of undesired trichlorotoluenes and other unidentified compounds. That the amount of 2,4,6-trialkylphenol is critical and that ratios of 2,4,6-trialkylphenol to nitrate ion above about 1:3 are detrimental is shown in Run No. 4. At a ratio of 1:2 reaction is completely inhibited.

Obviously many modifications and variations of the invention, as hereinabove set forth, can be made without departing from the spirit and scope thereof, and therefore only such limitations should be imposed as are indicated in the appended claims.

We claim:

1. In a process wherein an aromatic hydrocarbon or a halogenated aromatic hydrocarbon is heated with (1) a substance selected from the group consisting of nitrate ions, nitrite ions, NO and $NO_2$, (2) HCl, (3) water, (4) molecular oxygen and (5) a protonic acid having an ionization constant at 25° C. greater than about $10^{-2}$ selected from the group consisting of perchloric acid, toluene sulfonic acid, trifluoracetic acid, sulfuric acid and iodic acid, wherein the temperature employed is from about 15 to about 200° C., the pressure from about 0.1 to about 10,000 pounds per square inch gauge and the contact time about 0.0001 to about 200 hours, with the amount of HCl present relative to the aromatic hydrocarbon reactant, on a molar basis, being from about 20:1 to about 1:20, the amount of nitrate ion, nitrite ion, NO or $NO_2$, on a molar basis, relative to the aromatic charge, being from about 1:1 to about $1 \times 10^6$, the amount of water relative to the aromatic hydrocarbon reactant, on a molar basis, being from about 1,000:1 to about 0.1:1, the amount of oxygen relative to the aromatic hydrocarbon reactant, on a molar basis, being from about 1,000:1 to about 1:10, the amount of protonic acid relative to water, on a molar basis, being from about 2:1 to about 1:20, the improvement which comprises controlling nuclear chlorination of said aromatic hydrocarbon so that only one chlorine is added to the ring by conducting said process in the additional presence of 2,4,6-trialkylphenol, wherein the individual alkyl substituents have from one to 20 carbon atoms, the amount of said 2,4,6-trialkylphenol relative to said nitrate ion, nitrite ion, NO or $NO_2$, on a molar basis, being from about 1:100 to about 1:3.

2. The process of claim 1 wherein the temperature employed is from about 60 to about 150° C., the pressure is from about 10 to about 1,000 pounds per square inch gauge, the contact time is from about 1 to about 10 hours, the amount of HCl present relative to the aromatic reactant, on a molar basis, is from about 6:1 to about 1:2, the amount of nitrate ion, nitrite ion, NO or $NO_2$, on a molar basis, relative to the aromatic charge, is from about 1:3 to about $1 \times 10^6$, the amount of water, relative to the aromatic reactant, on a molar basis, is from about 100:1 to about 2:1, the amount of oxygen relative to the aromatic reactant, on a molar basis, is from about 10:1 to about 1:1, the amount of protonic acid relative to water, on a molar basis, is from about 1:2 to about 1:8 and the amount of 2,4,6-trialkylphenol relative to the nitrate ion, nitrite ion, NO or $NO_2$ on a molar basis, is from about 1:20 to about 1:5.

3. The process of claim 1 wherein said phenol is 2,6-di-t-butyl-p-cresol.

4. The process of claim 1 wherein said phenol is 2,4,6-tri-t-butylphenol.

5. The process of claim 1 wherein a nitrate ion is present and the same is obtained from $HNO_3$.

6. The process of claim 1 wherein said protonic acid is sulfuric acid.

7. The process of claim 1 wherein said aromatic hydrocarbon charge is ortho chlorotoluene.

* * * * *